United States Patent [19]

Shinsen

[11] Patent Number: 4,518,369

[45] Date of Patent: May 21, 1985

[54] COUPLING ARRANGEMENT FOR ROTATING SHAFTS

[75] Inventor: Mitsuhisa Shinsen, Komatsu, Japan

[73] Assignee: Kabushiki Kaisha Komatsu Seisakusho, Tokyo, Japan

[21] Appl. No.: 486,828

[22] Filed: Apr. 20, 1983

[51] Int. Cl.³ .............................................. F16D 3/52
[52] U.S. Cl. .................... 464/101; 403/354; 403/372
[58] Field of Search .................. 403/354, 361, 372; 464/101

[56] References Cited

U.S. PATENT DOCUMENTS

| | | | |
|---|---|---|---|
| 1,333,436 | 3/1920 | Monroe | 403/354 X |
| 1,909,353 | 5/1933 | Hughes et al. | 403/361 X |
| 2,100,232 | 11/1937 | Barry | 464/101 |
| 2,183,824 | 12/1939 | Smith | 403/354 |
| 3,286,489 | 11/1966 | Turro | 464/101 |
| 3,313,126 | 4/1967 | Somervell | 464/101 |
| 4,121,476 | 10/1978 | Hammond | |

FOREIGN PATENT DOCUMENTS 1253984 11/1967 Fed. Rep. of Germany ...... 464/101

*Primary Examiner*—Andrew V. Kundrat
*Attorney, Agent, or Firm*—Armstrong, Nikaido, Marmelstein & Kubovcik

[57] ABSTRACT

A coupling arrangement for rotating shafts using a leaf spring as a coupler. The arrangement includes a first and a second shaft disposed in alignment with each other. The first shaft has formed therein at one end face thereof a slit extending at right angles with the axis thereof and the second shaft has formed thereon at one end face thereof a tongue which is adapted to be inserted into the slit when mounted in place. The leaf spring is inserted into the slit for clamping the tongue against rotation.

1 Claim, 5 Drawing Figures

4,518,369

COUPLING ARRANGEMENT FOR ROTATING SHAFTS

BACKGROUND OF THE INVENTION

This invention relates to a coupling device for coupling rotating shafts of mechanical parts of locating them coaxially and engaging them in the direction of rotation thereof.

As for coupling devices of the kind specified, there have so far been employed elastic rubber couplings and cross joints etc. which are adapted to accommodate dimensional errors or deviations in the manufacture of mechanical parts.

However, in case of connecting a small precision electronic part, for example, a potentiometer with a rotating shaft of manual lever or foot pedal, the above-mentioned arrangement is disadvantageous in that it is uneconomical in respects of the space and cost thereof. Further, in case of the potentiometer, because it serves to transmit the angle of rotation instead of the number of rotations, its efficiency will drop even with a small play. Where the arrangement is simplified using slits or yokes in place of the above-mentioned prior art example, deviations in the angle of rotation will increase even with a small play of the parts and so its efficiency will become lower as mentioned above. If the play of mechanical parts is reduced to prevent such a trouble, the difficulties encountered in the manufacture and assembly of them can be eliminated; however, there is a disadvantage in that when a play occurs in the rotating shaft on the driving side like a pedal shaft etc. due to a change with the lapse of time, the potentiometer may be damaged.

SUMMARY OF THE INVENTION

It is therefore an object of the present invention to provide a coupling arrangement for rotating shafts which overcomes the above noted problems of prior art.

Another object of the present invention is to provide a coupling arrangement for rotating shafts which can effectively and precisely transmit rotating angles of one member to another.

A further object of the present invention is to provide a coupling arrangement for rotating shafts which is adapted to be accommodated in a small space.

In accordance with an aspect of the present invention, there is provided a coupling arrangement for rotating shafts, comprising: a first shaft having an end face, said first shaft having formed in the end face a slit extending at right angles with the axis thereof; a second shaft disposed in alignment with said first shaft, said second shaft having an end face opposite the end face of said first shaft; a tongue extending from the end face of said second shaft in alignment with said first and second shafts, said tongue being adapted to be inserted into the slit with enough clearance; and leaf spring means adapted to be inserted into the slit for coupling against rotation said first and second shafts through said tongue, said leaf spring means having a crown and two leg portions, the crown being inserted into the slit and the two leg portions being adapted to clamp said tongue in such a manner that no relative rotary motion occurs between said first shaft and said tongue.

The above and other objects, features and advantages of the present invention will be readily apparent from the following description taken in conjunction with the accompanying drawings.

DESCRIPTION OF THE PREFERRED EMBODIMENT

Figure 1:
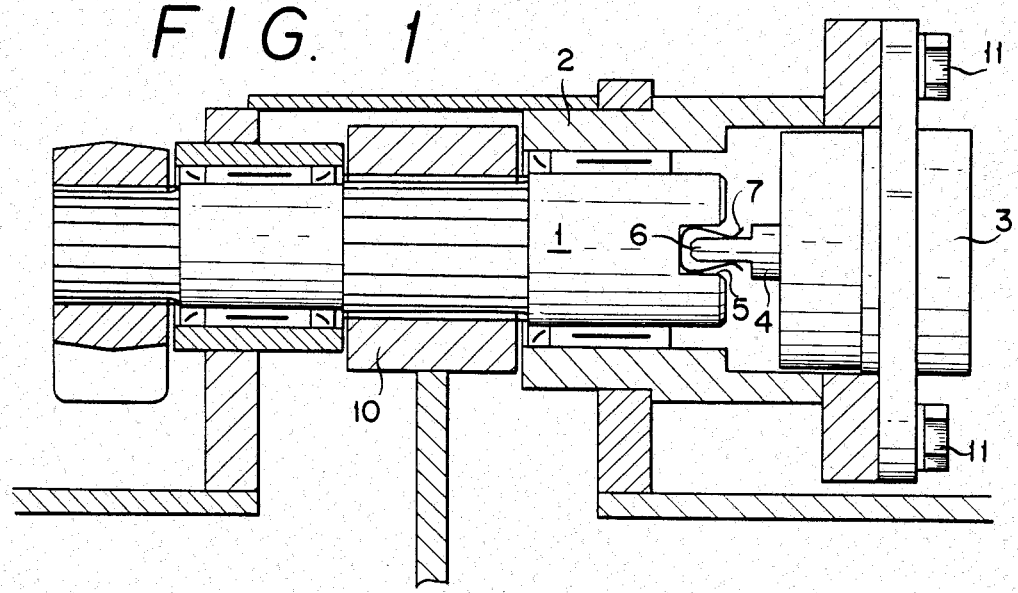
FIG. 1 is a longitudinal sectional view of a coupling arrangement according to the present invention.
Figure 2:
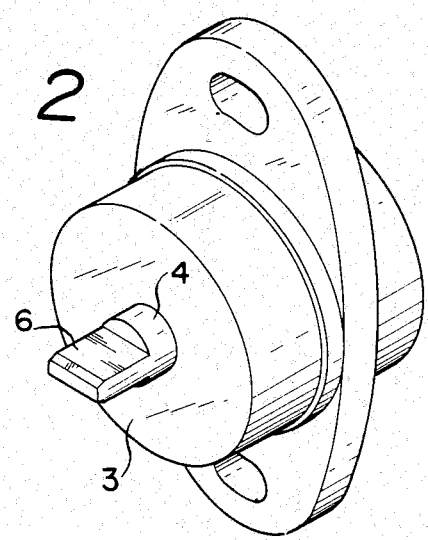
FIG. 2 is a perspective view of a potentiometer employed in FIG. 1.
Figure 3:
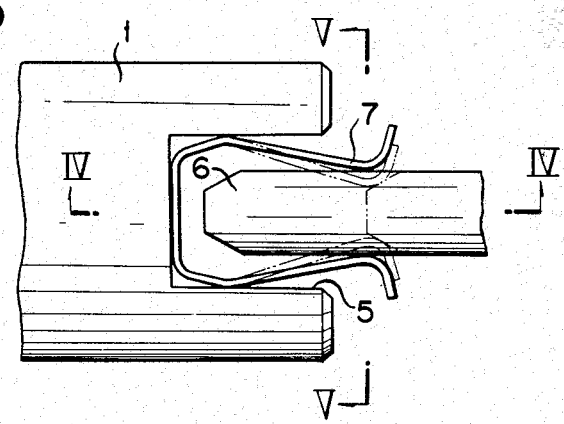
FIG. 3 is an enlarged view of the coupling portion of FIG. 1.
Figure 4:
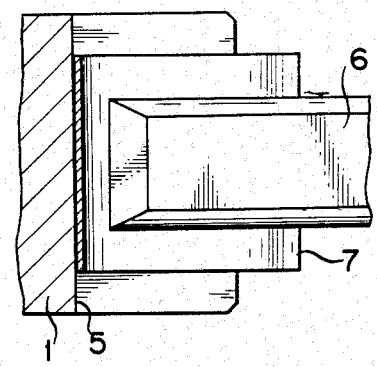
FIG. 4 is a sectional view taken along line IV—IV of FIG. 3.
Figure 5:
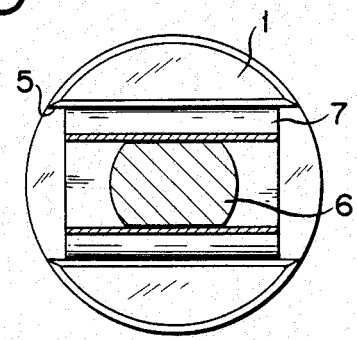
FIG. 5 is a sectional view taken along line V—V of FIG. 3.

The present invention will now be described by way of example only with reference to the accompanying drawings.

In the drawings, reference numeral 1 denotes a rotating shaft on the driving side rotatably carried by a bracket 2 and which has a spline connected with that of a pedal 10, 3 a potentiometer fixedly secured to the bracket 2 by means of bolts 11, and a rotating shaft 4 thereof. The rotating shafts 1 and 4 are arranged to rotate about the same axis.

The rotating shaft 1 on the driving side has a slit 5 formed in the end face in the direction at right angles to the axis thereof, whilst the rotating shaft 4 of the potentiometer 3 has a tongue 6 formed in the leading end thereof and which is adapted to fit in the aforementioned slit 5. The slit 5 and the tongue 6 are located on and along the rotational axis of the shafts 1 and 4 and in parallel with each other. The thickness of the tongue 6 is smaller than the width of the slit 5. Reference numeral 7 denotes a leaf spring formed in approximately $\Omega$ shape. The leaf spring 7 is formed into the slit 5 with its top part brought into contact with the inside surface of the slit 5. The spacing between the free ends of the leaf spring 7 is made smaller than the thickness of the tongue 6 so that the free ends may clamp the tongue 6.

Thus, when the foot pedal 10 is depressed, the rotating shaft 1 on the driving side will rotate to thereby rotate the driven shaft or the rotating shaft 4 of the potentiometer 3 through the leaf spring 7.

Further, the resilient force of the leaf spring 7 is larger than the required torque on the driven side, for example, on the potentiometer so that the leaf spring may not flex upon transmission of turning force.

Since the present invention is constructed as mentioned above, the device according to the invention can transmit an angle of rotation precisely without causing any play and occupies only a small space. Further, because the leaf spring 7 is arranged to absorb or accommodate possible misalignments of mechanical parts due to dimensional errors or deviations in the manufacture thereof or plays of rotating shafts due to changes with the lapse of time, no shaking or twisting of the rotating shafts will occur. Further, according to the present invention, the manufacturing cost of the coupling device can be reduced considerably.

It is to be understood that the foregoing description is merely illustrative of a preferred embodiment of the invention, and that the scope of the invention is not to be limited thereto, but is to be determined by the scope of the appended claims.

What is claimed is:

1. A coupling arrangement for rotating shafts, comprising:
- a first shaft having an end face, said first shaft having formed in the end face a slit extending at right angles with the axis thereof, said slit having straight, parallel sides and a flat bottom parallel with said end face;
- a second shaft disposed in alignment with said first shaft, said second shaft having an end face opposite the end face of said first shaft;
- a tongue extending from the end face of said second shaft in alighment with said first and second shafts, said tongue being adapted to be inserted into the slit with enough clearance and said tongue further having tapered edges at its outermost end; and
- leaf spring means adapted to be inserted into the slit for coupling against rotation between said first and second shafts through said tongue, said leaf spring means having a crown and two leg portions, the crown being inserted into the slit and the two leg portions being adapted to clamp said tongue in such a manner that no relative rotary motion occurs between said first shaft and said tongue, said tongue also having two flat surfaces parallel to each other and to the axis thereof such that said two leg portions of said leaf spring means clamp the respective flat surfaces.

* * * * *